Feb. 11, 1936.  R. N. BICKNELL  2,030,780
REFRIGERATING DISPLAY CABINET
Filed Feb. 23, 1935   3 Sheets-Sheet 1
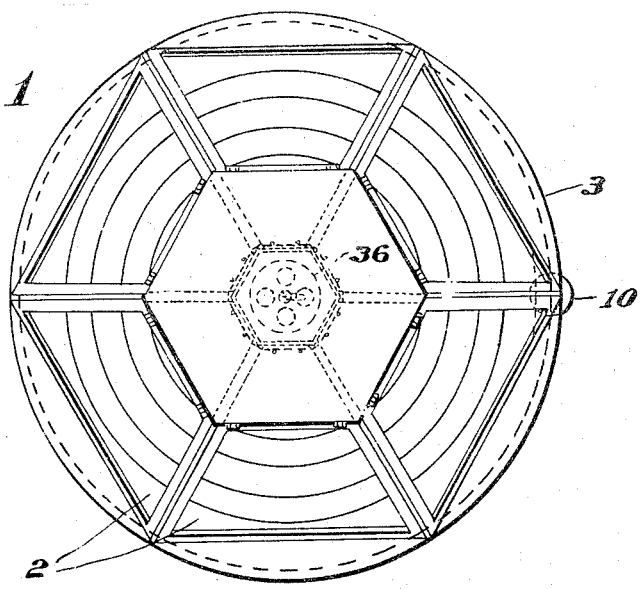
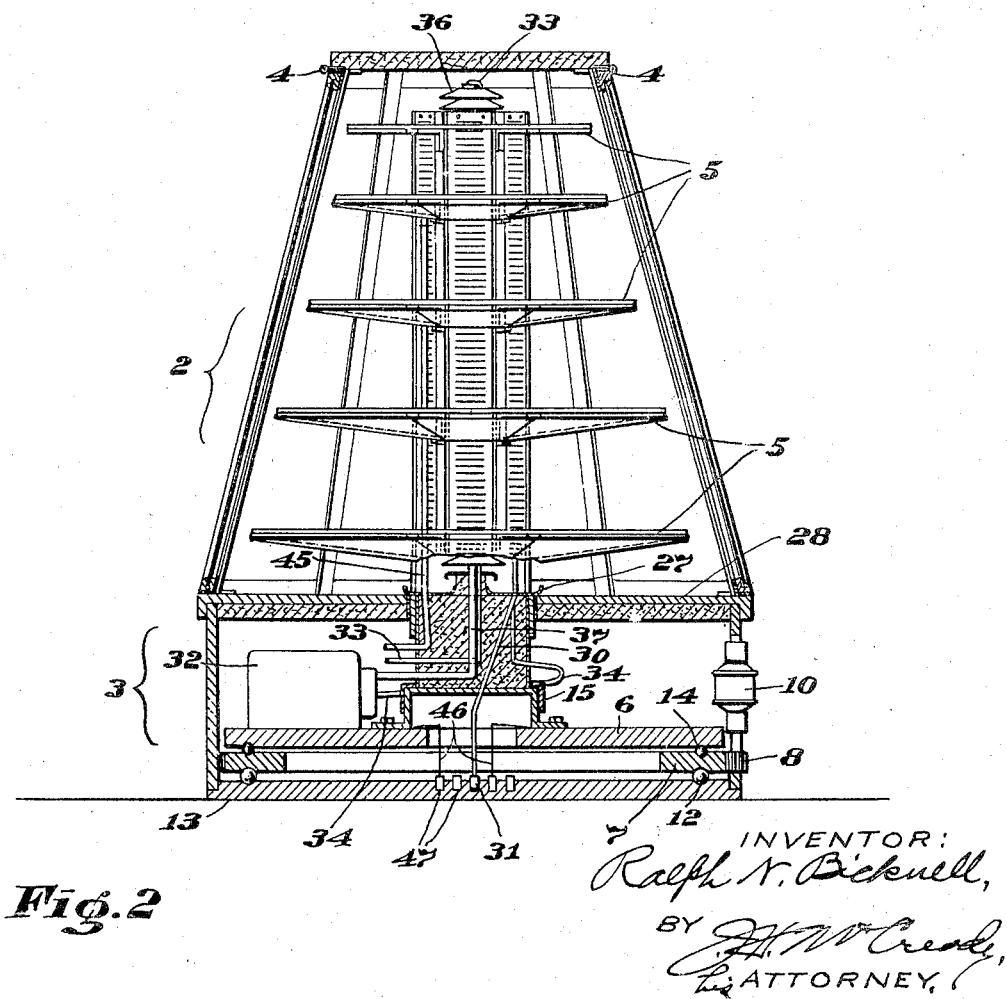

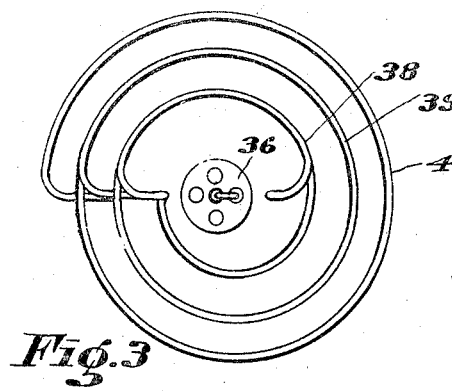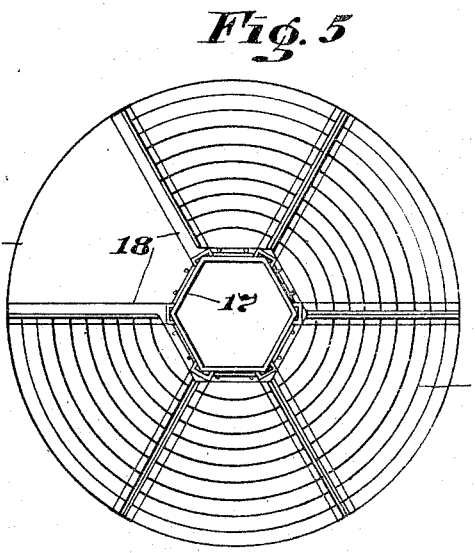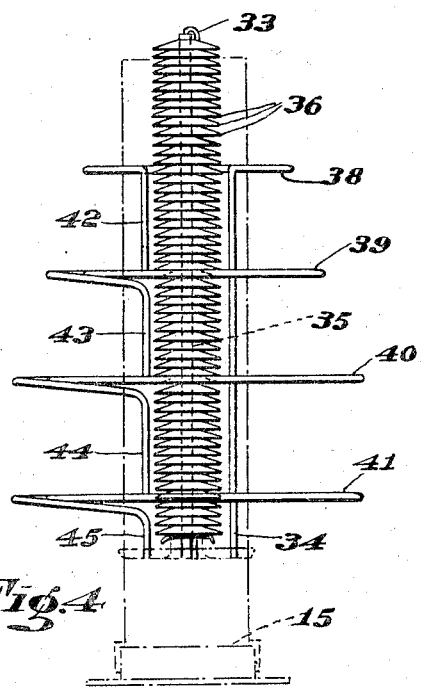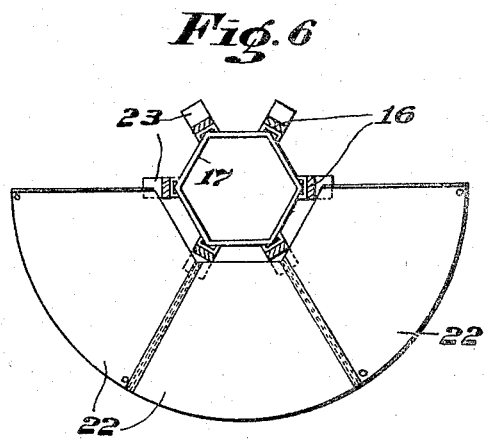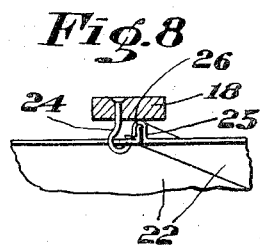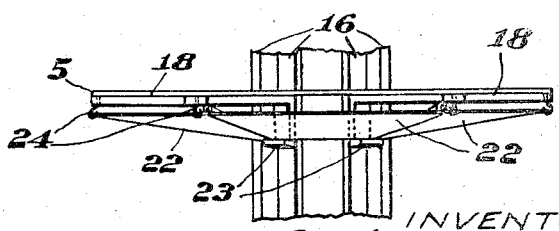

Feb. 11, 1936.   R. N. BICKNELL   2,030,780
REFRIGERATING DISPLAY CABINET
Filed Feb. 23, 1935   3 Sheets-Sheet 3
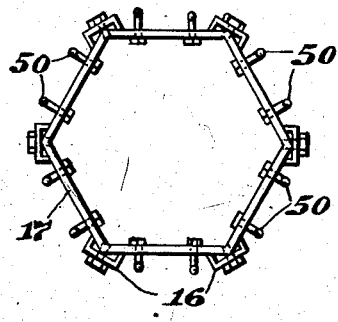
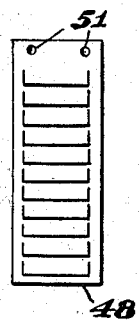
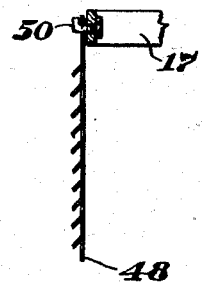
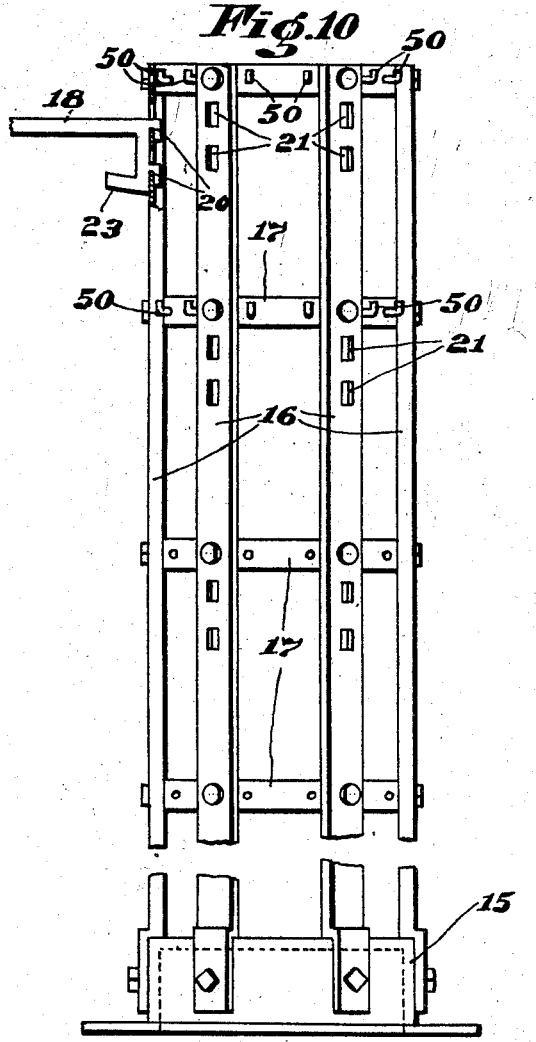
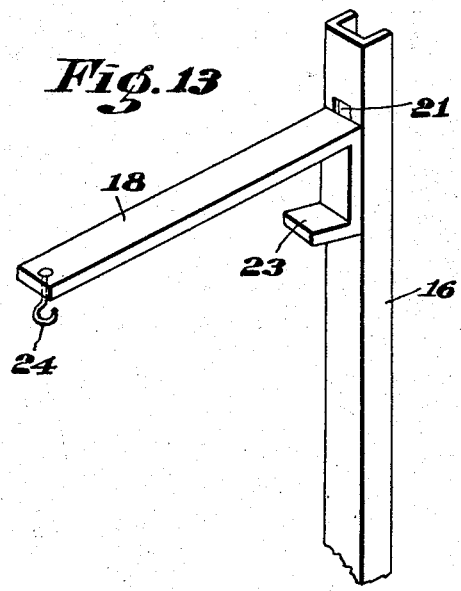
INVENTOR
Ralph N. Bicknell,
BY
ATTORNEY.

Patented Feb. 11, 1936

2,030,780

UNITED STATES PATENT OFFICE 2,030,780

REFRIGERATING DISPLAY CABINET

Ralph N. Bicknell, Bangor, Maine

Application February 23, 1935, Serial No. 7,760

5 Claims. (Cl. 312—99.5)

This invention relates to show cases, display cabinets, and other apparatus designed to display merchandise in an attractive manner. The invention is especially, but not exclusively, concerned with apparatus of this type designed for use in connection with the merchandising of foodstuffs and other perishable goods which must be kept cool, and in connection with which apparatus, therefore, refrigerating means must be used.

The invention aims to devise an apparatus of this general character which will be particularly effective in protecting the merchandise, displaying it attractively, and facilitating its sale.

The nature of the invention will be readily understood from the following description when read in connection with the accompanying drawings, and the novel features will be particularly pointed out in the appended claims.

In the drawings,

Figure 1 is a plan view of a display cabinet or show case embodying features of this invention;

Fig. 2 is a vertical, sectional view of the show case illustrated in Fig. 1;

Figs. 3 and 4 are plan and side views, respectively, of elements of the refrigerating system;

Figs. 5 and 6 are plan views illustrating details of the apparatus for supporting the merchandise, Fig. 6 being partly in section;

Figs. 7 and 8 are side views illustrating additional details of this structure;

Figs. 9 and 10 are plan and side views, respectively, showing the skeleton structure for supporting the shelves, a portion of Fig. 10 being in vertical section;

Figs. 11 and 12 are side and sectional views, respectively, of the baffle plates; and Fig. 13 is a perspective view illustrating additional details of the support shown in Fig. 10.

Referring first to Figs. 1 and 2, the apparatus there shown comprises a casing, including a display section 2 and supporting base portion 3. The sides of the display section are composed chiefly of glass, or other transparent material, so that the merchandise inside of it may be readily seen, the glass sections being double, with an air space between, to provide good heat insulation. Also, the glass sections may be hinged either at their upper edges, as shown at 4, Fig. 2, or in any other convenient manner, so that the clerks or attendants can readily open the case or cabinet to obtain access to the goods contained in it. By making the case of hexagonal form, as shown, the manufacturing operations are facilitated and the cost of manufacture is reduced.

Mounted in the cabinet is a display structure comprising a series of shelves 5, all carried by a common support and arranged to revolve about a vertical axis. As best shown in Fig. 2, the shelves and their supporting structure are all mounted on a turn table 6 which, in turn, is supported on an annular base or ring gear 7, arranged to be driven by a pinion 8 secured fast on the shaft of a small electric motor 10. A series of balls 12 running in a race formed in the base plate 13 support the ring gear 7, while another series of balls 14, preferably of a smaller size than the balls 12, interposed between the ring gear and the turn table 6, support the latter for rotation, either with the ring gear or independently of it. Normally the whole display structure, including the shelves 5, rotates slowly with the ring gear 7, but whenever the clerk opens the cabinet for the purpose of placing an article of merchandise on one of the shelves, or removing it therefrom, he can easily stop the rotation of the shelves simply by placing his hand on one of them, this action being permitted by the presence of the upper set of ball bearings 14, and avoiding any necessity for stopping the motor or any of the connecting mechanism between the turn table and the motor.

While the display structure may take any convenient form, and its construction necessarily will depend upon the requirements of individual situations, a design which can be manufactured economically and lends itself readily to modification is shown in Figs. 5 to 10. Referring first to Figs. 9 and 10 it will be seen that this structure comprises a sheet metal base 15 which rests on and is bolted to the turn table 6. Secured to the sides of this base are several uprights 16, all substantially alike, and each consisting of a channel member. At intervals these members are bolted to hexagonal pieces 17 which cooperate with the uprights to form a stiff rigid structure of light weight.

The shelves are somewhat sector-shaped and they may be made either of a woven wire construction or of metal plates. They are supported on arms 18 projecting radially from the skeleton structure shown in Figs. 9 and 10, six such arms being located at each of the five levels illustrated in Fig. 2. Referring to Figs. 5, 10 and 13, it will be seen that each of these arms 18 has a horizontal upper surface to support shelf units, and that each arm is located at the junction of the sections of the shelves so that the adjacent edges of two adjoining shelf sections rest on a single arm. For convenience in manufacture and assembly, each arm is provided with two rearwardly extending lugs 20, Fig. 10, which fit into vertical slots 21 in the uprights 16, the arrangement being such that the arms may be removed by forcing them upwardly far enough to permit the lugs to come through the slots. Immediately under each shelf is a drip pan also made in sections, as shown at 22 in Figs. 6, 7 and 8. These units likewise are removably supported on the arms 18, each arm having a lug 23, best shown in Figs. 10 and 13, immediately under the main horizontal portion of the arm on which the inner edges of the drip pan sections rest. Also, the arms carry hooks 24 at their outer ends to enter holes in the outer margins of the drip pan sections and thus to support these elements. If desired, one margin of each section 22 may be provided with a grooved rib 25, Fig. 8, to receive an upwardly projecting lip or flange 26 of the adjoining section so that any possibility of the condensation dropping from one shelf on to the goods supported on the next lower shelf will be avoided. All of the drip sections 22 are inclined, and the condensation which they collect thus runs to their inner edges where it drops into an annular drip pan 27, Fig. 2, located immediately above the level of the base 28 of the casing 2. A tube 30 conducts the drip from this pan to a central pocket or cup 31 where it may either be collected and removed at suitable intervals, or this cup may be connected through a suitable trap with the waste water system, so that the drip will be carried away substantially as fast as it collects.

The apparatus also includes a mechanical refrigerating system of any suitable type having coils or other heat absorbing elements so associated with the shelves as to maintain the food stuffs or other merchandise at the desired temperature. As shown, this system comprises a mechanical refrigerating unit 32, Fig. 2, mounted on the turn table 6 to revolve therewith, together with suitable expansion coils and the necessary connections between them and the unit. In the particular arrangement shown, the high pressure refrigerant is conducted away from the unit 32 through two pipes, one indicated at 33 and the other at 34. The former runs directly to the top of a central expansion coil or unit 35, Fig. 4, which is located inside the skeleton support 16—17. It is provided with a multiplicity of fins or flanges 36 which serve to absorb heat, the low pressure refrigerant being conducted from the bottom of the coil 35 back to the unit 32 through the pipe 37.

The other coil consists of a series of coil sections 38, 39, 40 and 41, all connected together and associated, respectively, with the four lower shelves, each section being located between its respective shelf and the drip pan for that shelf. The pipe 34 conducts high pressure refrigerant to the uppermost section 38 of the expansion coil through which the refrigerant flows and thence is conducted downwardly through the leg 42, Fig. 4, to the next coil section 39 which, in turn, is connected by another leg 43 with the section 40, the latter also communicating through the leg 44 with the section 41 and the expanded refrigerant from this section being conducted back through the return pipe 45 to the unit 32. Thus the entire refrigerating system revolves with the shelves and the relationship between them remains constant. Current for operating the electric motor included in the unit 32 is conducted to it through brushes 46 running on the slip rings 47 secured in the base plate 13.

For the purpose of concealing the central expansion unit 36 and providing for a more uniform distribution of the air, a series of baffle plates 48 are mounted on the skeleton frame 16—17, this frame being provided with hooks 50, Figs. 9, 10 and 12, located between the uprights 16 to enter holes 51, Fig. 11, in the upper edges of the baffle plates.

The bottom of the casing 2 and the top of the base 3 should be made of such materials, or of such a construction, as to have good heat insulating properties. Also, the joint where the support 16—17 passes through the bottom 28 of the casing should be made sufficiently tight to prevent any substantial interchange of air between the casing and the base. This can be conveniently done by filling the skeleton support with wood or other heat insulating material, and encircling the entire structure with a wood or fiber bushing which will fit nicely into the circular hole through the base plate 28.

It will be evident from the foregoing that the invention provides a display cabinet or show case which is especially useful in connection with the merchandising of food stuffs that must be kept below a certain temperature in order to preserve them. It not only permits the attractive display of goods of this character, but also presents such merchandise conveniently for the selection of purchases by the customer and facilitates the work of the clerk or attendant in waiting on the customer. At the same time the goods are kept in a cool and fresh condition. The apparatus requires no more attention than the ordinary refrigerator show case. Because of the rotation of the shelves and the consequent circulation of air created, any tendency for the glass sections of the cabinet to frost up is minimized.

While I have herein shown and described a preferred embodiment of my invention, it will be understood that the invention may be embodied in other forms without departing from the spirit or scope thereof.

Having thus described my invention, what I desire to claim as new is:

1. In a show case of the character described, the combination of a casing having transparent portions and a base portion, a display structure in said casing, a turn table on which said structure is mounted, a disk-like rotary member between the turn table and the base portion and supporting said turn table, a motor, connections driven thereby for revolving said member, and anti-friction bearings between said member and said turn table through which the rotary motion of the member normally is transmitted to the turn table but which permits rotation of the member independently of said turn table.

2. In a show case of the character described, the combination of a casing having transparent portions and a base portion, a display structure in said casing, a rotary support on which said structure is mounted for rotation about an upright axis, a power operated refrigerating system mounted on said support and revolving therewith and serving to cool the goods mounted on said structure, a disk-like rotary member between the base portion and said support on which said support is mounted for normal rotation therewith, said member being free to rotate independently of said support, and a motor operatively connected with said member to drive it.

3. In a show case of the character described, the combination of a portable casing having transparent portions and a base portion, a display structure in said casing, means supporting said structure for rotation relatively to said casing and about an upright axis, mechanism for revolving said structure, said mechanism including a motor and driving connections between said motor and said structure for revolving the latter normally therewith, including a disk-like rotary member between the base portion and said supporting means, said casing having a section adapted to be opened to permit access to said structure, and a power operated refrigerating system mounted on said supporting means for rotation with said structure.

4. In a show case of the character described, the combination of a casing having transparent portions, a display structure in said casing, means supporting said structure for rotation relatively to said casing, power driven mechanism for revolving said structure, and a mechanical refrigerating system revolving with said structure and serving to cool the goods supported on it, said display structure comprising shelves mounted one above another to rotate about a common upright axis and in which refrigerating coils forming part of said refrigerating system are spaced along said shelves, the power unit for said refrigerating system being contained in a compartment separate from that in which the display structure is mounted.

5. In a show case of the character described, the combination of a casing having transparent portions, a display structure in said casing, means supporting said structure for rotation relatively to said casing, power driven mechanism for revolving said structure, and a mechanical refrigerating system revolving with said structure and serving to cool the goods supported on it, said display structure comprising a support mounted to rotate about an upright axis and including shelves mounted on said support, in combination with refrigerating coils carried by said structure, said coils forming part of said refrigerating system, the power unit for said refrigerating system being contained in a compartment separate from that in which the display structure is mounted.

RALPH N. BICKNELL.